US005742412A

United States Patent [19]

Minemoto et al.

[11] Patent Number: 5,742,412

[45] Date of Patent: Apr. 21, 1998

[54] INK JET TYPE HEAD FOR PIGMENT TYPE INK WITH DIFFERENT PULSES APPLIED TO ELECTRODES

[75] Inventors: Hitoshi Minemoto; Yoshihiro Hagiwara; Ryousuke Uematsu; Junichi Suetsugu; Kazuo Shima, all of Tokyo, Japan

[73] Assignee: NEC Corporation, Tokyo, Japan

[21] Appl. No.: 760,224

[22] Filed: Dec. 4, 1996

[30] Foreign Application Priority Data

Dec. 5, 1995 [JP] Japan .................................... 7-316665

[51] Int. Cl.[6] .................................................. G02F 1/1343

[52] U.S. Cl. ................................ 359/55; 347/20; 347/40; 347/52

[58] Field of Search .................................. 359/55; 347/1, 347/10, 20, 40, 43, 50, 51, 55, 52

[56] References Cited

U.S. PATENT DOCUMENTS 5,552,809 9/1996 Hosono et al. .......................... 347/10

5,619,234 4/1997 Nagato et al. .......................... 347/55

*Primary Examiner*—Frank G. Font

*Assistant Examiner*—Robert Kim

*Attorney, Agent, or Firm*—Sughrue, Mion, Zinn, Macpeak & Seas, PLLC

[57] ABSTRACT

An ink jet type head has a plurality of ink ejection electrodes in a form of parallel strips formed on a base. The ink ejection electrodes include first ejection electrode and second ejection electrodes provided adjacent to two sides of the first ejection electrode. There is provided a voltage driving unit for applying an ejection voltage for ink ejection to the first ejection electrode. In the voltage driving unit, the ejection voltage to cause the ink to be ejected is applied to the first ejection electrode and an auxiliary voltage ineffective to cause the ink to be ejected is applied to the second ejection electrodes. This enables the reduction of potential differences between the first and second ejection electrodes, thus suppressing movement of color particles of the ink between them.

4 Claims, 7 Drawing Sheets

INK JET TYPE HEAD FOR PIGMENT TYPE INK WITH DIFFERENT PULSES APPLIED TO ELECTRODES

BACKGROUND OF THE INVENTION (1) Field of the Invention

The present invention relates to ink jet type heads, and more particularly to ink jet type heads for causing color particles in a pigment type ink to be ejected by the action of an electric field for printing.

(2) Description of the Related Art

A prior art ink jet type head of the kind to which the present invention relates is first explained with reference to FIGS. 1 to 4. As shown in FIGS. 1 and 2, a plurality of ink ejection electrodes 55 are formed in parallel with one another on a head base. The head base also has an ink chamber 51 formed on the surface with the ink ejection electrodes 55 formed thereon. A pigment type ink 60 is held in the ink chamber 51. The ink chamber 51 has an ink ejection opening 52 with a plurality of meniscus forming sections defined by a plurality of ink passage walls 58 each corresponding in position to each of the ink ejection electrodes 55. An opposite electrode 59 is disposed on the imaginary extensions of the ink ejection electrodes 55 such that it faces the ink ejection electrodes 55 via a sheet 54. The opposite electrode 59 is grounded via a predetermined resistance. An electrophoresis electrode 53 is disposed on the inner wall surface of the ink chamber 51 on the side thereof opposite the ink ejection opening 52 such that it is in contact with the ink 60. The top wall of the ink chamber 51 has an ink inlet port 56 and an ink outlet port 57 for circulation of the ink 60 through the ink chamber 51.

The head base, on which the ink ejection electrodes 55 are formed, is made of such material as glass. The ink ejection electrodes 55 are formed by patterning such material as Cu and Ni, and they are formed at an interval of 85 μm. The walls defining the ink chamber 51 are made of a dielectric material. The ink passage walls 58 are also made of a dielectric material. The electrophoresis electrode 53 and the opposite electrode 59 are both conductive, and the electrophoresis electrode 53 is insulated from the ink ejection electrodes 55. The ink 60 is composed of fine particles of colored thermosetting resin, i.e., toner, dispersed together with a charging control material in a petroleum type organic solvent (i.e., isoparaffin). The toner is apparently charged to positive polarity by zeta potential. The sheet 54 may be a paper sheet. The ink inlet and outlet ports 56 and 57 are connected via a tube with a pump to an ink tank (not shown) for generating a negative pressure in the ink chamber 51 and also for forced circulation of ink. For the electrophoresis electrode 53, a means (not shown) is provided for applying a bias voltage V1 of the same polarity as the color particles.

As shown in FIG. 2, the ink ejection electrodes 55 are connected to a voltage driving unit 62. The voltage driving unit 62 applies an ejection voltage Vej as a pulse voltage to each of ink ejection electrodes 55 for ejecting ink.

When the head is set to an operative state, as shown in FIG. 3, a bias voltage V1 of the same polarity as the color particles is applied to the electrophoresis electrode 53. An electric field is thus generated to cause color particles to undergo electrophoresis and gather in the ink ejection opening 52. A convex meniscus is thus formed at the free end of each ink passage wall 58. When the ejection voltage Vej shown in FIG. 3 is applied to the ink ejection electrode 55 designated to eject ink, color particles are caused to gather more densely at the end of the convex ink meniscus formed at the end of the corresponding ink passage wall 58. When the electrostatic force acting on the gathered color particles surpasses the surface tension in the ink meniscus, a small mass 61 of color particles is caused to be ejected towards the opposite electrode 59. The ejected color particle mass 61 is attached to the sheet 54, and printing is thus effected.

As mentioned above, the ejection voltage Vej applied to the ink ejection electrode 55 has the same polarity as the color particles in the ink 60.

In the above prior art example, however, the electric field that is generated by the application of the ejection voltage Vej to the ink ejection electrode 55 designated to eject ink, has an action of causing color particles having been concentrated in the proximity of the ink ejection electrode 55 to escape in the directions of arrows A shown in FIG. 4. This results in a non-uniform color particle density in the longitudinal direction of the ink ejection opening 52, thus leading to fluctuations of the amount of particle masses from the ink ejection electrodes designated to eject ink. In addition, continuous driving of a particular ink ejection electrode 55 results in the inability of concentrating sufficient color particles at the ink meniscus making it unable to eject particle masses.

SUMMARY OF THE INVENTION

An object of the invention is to overcome the drawbacks discussed above which are inherent in the prior art and to provide an ink jet type head which can ensure stable ejection of particle masses.

According to one aspect of the invention, there is provided an ink jet type head comprising:

- a plurality of ink ejection electrodes in a form of parallel strips formed on a base;
- an ink chamber for holding an ink of a pigment type on the base on which the ink ejection electrodes are provided;
- an opposite electrode disposed on an imaginary extension of the ink ejection electrodes and facing the ink ejection electrodes with a sheet disposed between the opposite electrode and the ink ejection electrodes;
- an ink ejection opening provided in the ink chamber and facing the opposite electrode;
- an electrophoresis electrode disposed in the ink chamber and serving to cause electrophoresis of charged color particles contained in the ink towards the ink ejection opening;
- a first ejection electrode included among the plurality of ink ejection electrodes;
- second ejection electrodes included among the plurality of ink ejection electrodes and provided adjacent to two sides of the first ejection electrode; and
- a voltage driving unit for applying an ejection voltage for ink ejection to the first ejection electrode, the voltage driving unit applying the ejection voltage effective to cause the ink to be ejected to the first ejection electrode and applying an auxiliary voltage ineffective to cause the ink to be ejected to the second ejection electrodes.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENT OF THE INVENTION

An embodiment of the invention will now be described with reference to FIGS. 5 to 8. In these figures, the same elements as those in the above prior art head are assigned the same numerals and are not described.

Figure 5:
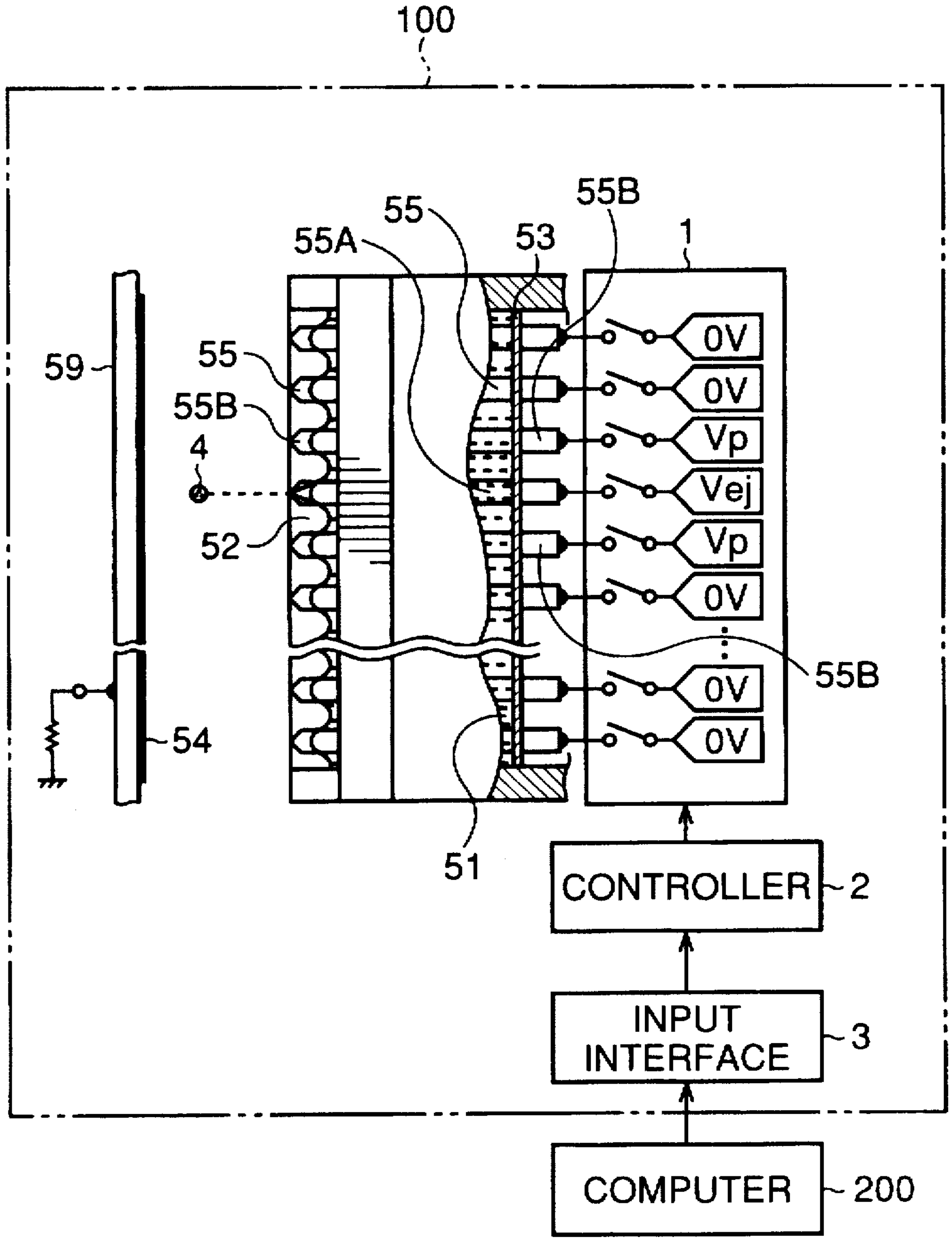
FIG. 5 is a schematic representation of an embodiment of the invention.

As shown in FIG. 5, the illustrated ink jet type head 100 comprises a plurality of ink ejection electrodes 55 in a form of parallel strips formed on a head base, an ink chamber 51 which is formed on the head base having the ink ejection electrodes 55 formed thereon and which holds an ink of a pigment type, an opposite electrode 59 provided on the imaginary extensions of the ink ejection electrodes 55 and facing the same via a sheet 54, an ink ejection opening 52 provided in the ink chamber 51 and facing the opposite electrode 59, an electrophoresis electrode 53 provided in the ink chamber 51 so as to cause electrophoresis of charged color particles contained in the pigment type ink to the ink ejection opening 52, and a voltage driving unit 1 for selectively applying a predetermined voltage for ink ejection to a plurality of ink ejection electrodes 55. The voltage driving unit 1 applies an ejection voltage Vej to each ink ejection electrode 55A designated to eject ink and also applies a predetermined auxiliary voltage Vp not effective to cause ink ejection to the ink ejection electrodes 55B disposed adjacent to the two sides of the ink ejection electrode 55A designed to eject ink.

The auxiliary voltage Vp applied by the voltage driving unit in this embodiment, is a train of pulse voltages each being substantially the same in level as the ejection voltage Vej and having a pulse width smaller than the pulse width T2 of the ejection voltage Vej. The voltage driving unit 1 starts the application of the auxiliary voltage Vp substantially simultaneously with the start of application of the ejection voltage Vej and ends the application of the auxiliary voltage Vp a predetermined period of time after the end of application of the ejection voltage Vej.

An input interface 3 which receives printing data from a host computer 200 and a controller 2 which sets and controls a voltage so as to be applied to each ink ejection electrode 55 according to the received printing data, are connected to the voltage driving unit 1. The remainder of the arrangement is the same as in the prior art head described above.

The operation of the embodiment will now be described.

Figure 1:
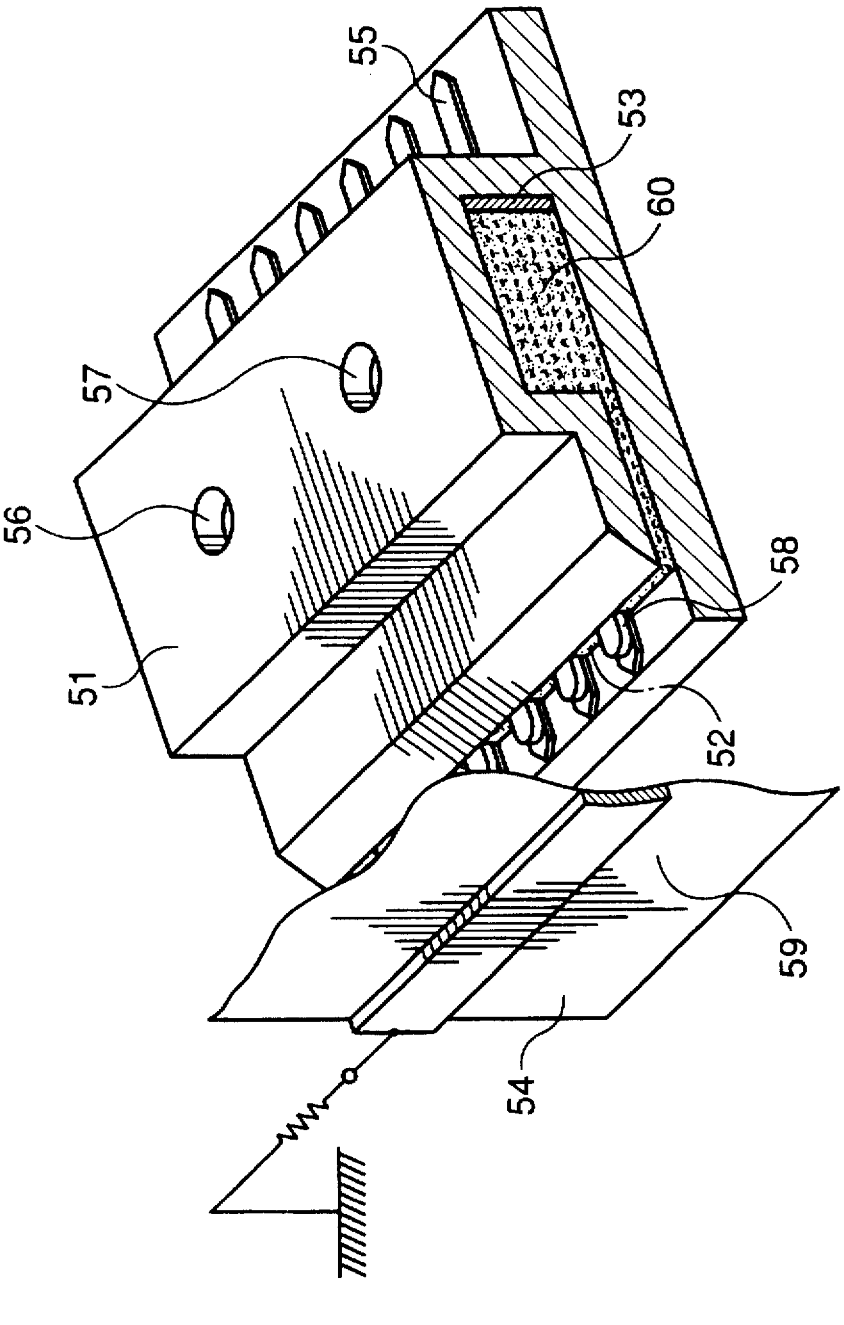
FIG. 1 PRIOR ART
FIG. 1 is a perspective view, partly in section, showing a prior art ink jet type.
Figure 2:
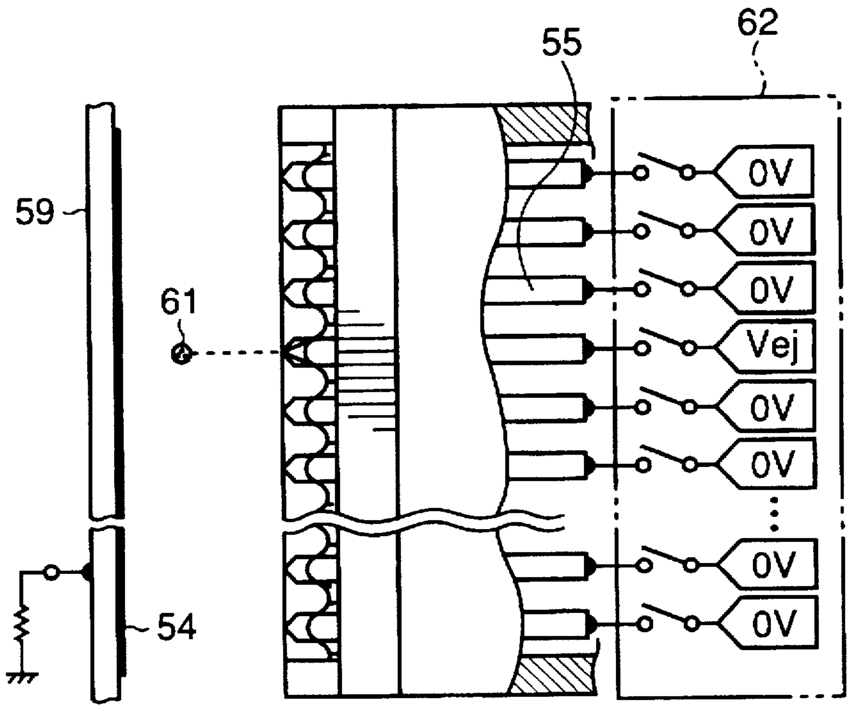
FIG. 2 PRIOR ART
FIG. 2 is a view, showing the prior art ink jet head.
Figure 3A:
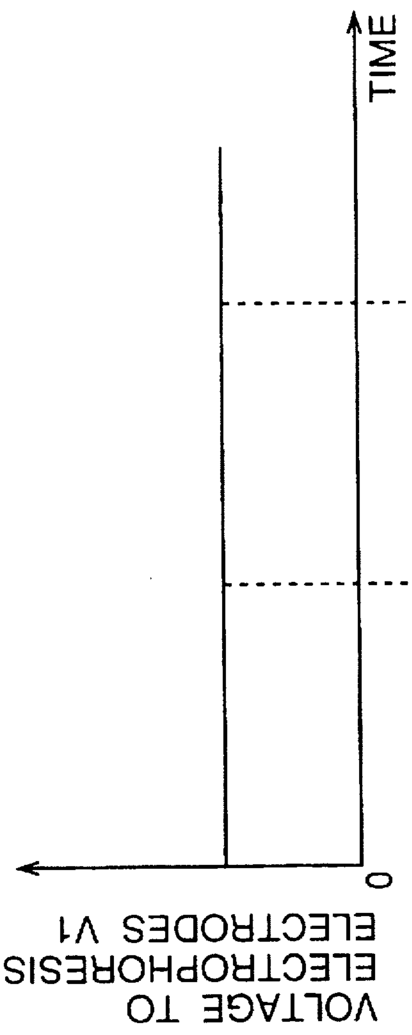
FIG. 3A PRIOR ART
FIG. 3 is a graph showing voltages applied to an electrophoresis electrode and an ink ejection electrode in the prior art ink jet head.
Figure 3B:
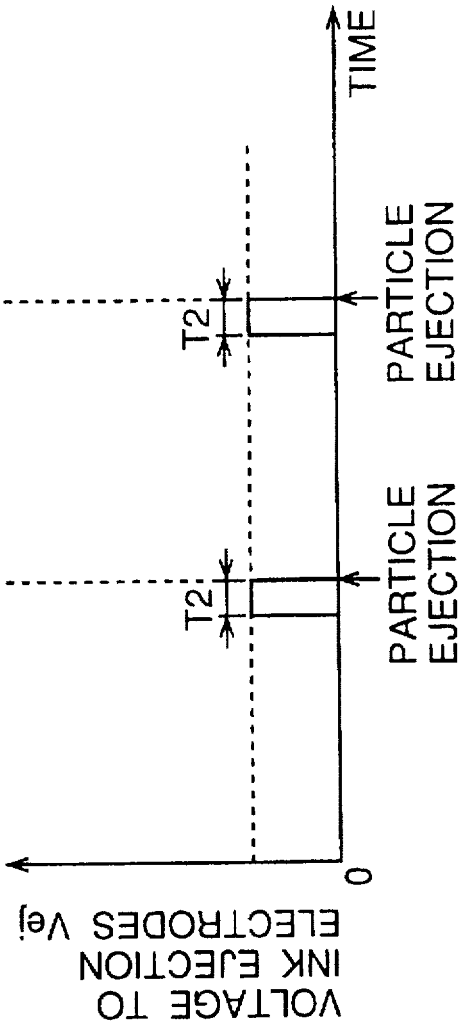
FIG. 3B PRIOR ART
Figure 7:
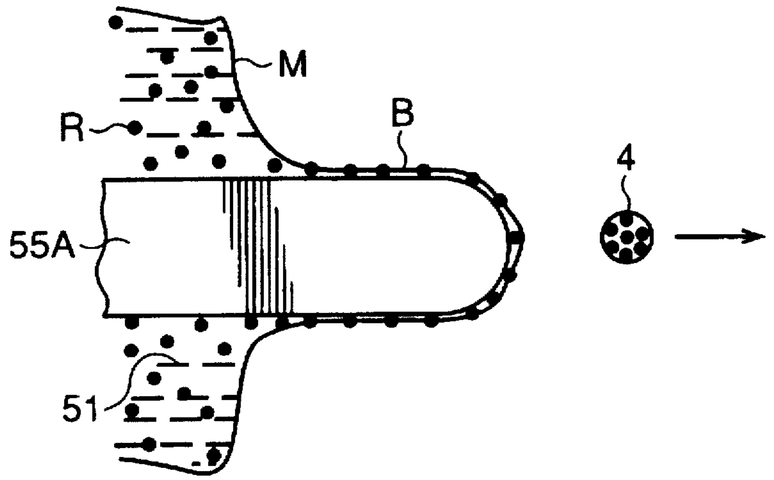
FIG. 7 is a view showing an ink meniscus formed at the end of an ink ejection electrode with the ejection voltage applied thereto.

When a constant voltage V1 as in the prior art example shown in FIG. 3 is applied to the electrophoresis electrode 53 while an electric field is applied to the ink chamber 51 filled with pigment type ink, the color particles R in the pigment type ink are moved at a predetermined electrophoresis speed to the ink ejection opening 52. As shown in FIG. 7, the movement of the color particles R to the ink ejection opening 52 has an effect of forming an ink meniscus M at the end of each ink ejection electrode 55.

Figure 6A:
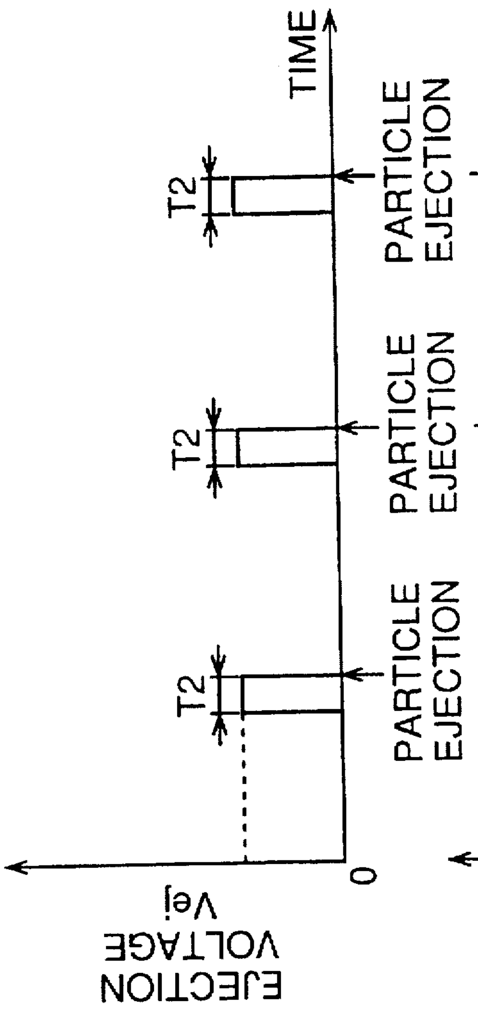
FIG. 6 is a graph showing an ejection voltage and an auxiliary voltage applied to ink ejection electrodes shown in FIG. 5.
Figure 6B:
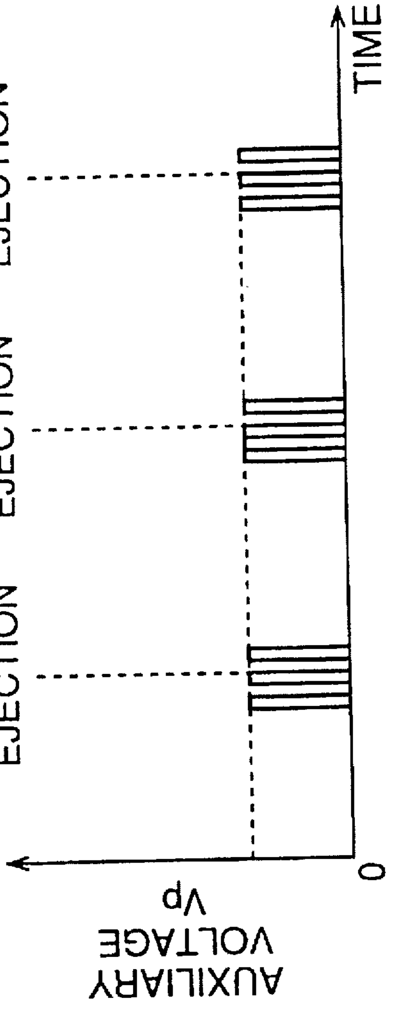

The controller 2 sends out control signals to the voltage driving unit 1 by setting voltages to be applied to each ink ejection electrode 55A designated to eject ink and also to the ink ejection electrodes 55B which are adjacent to the two sides of the designated ink ejection electrode 55A but are not designated to eject ink according to printing data and print control signals coupled through the input interface 3 from the host computer 200. As shown in FIG. 6, the voltage driving unit 1, upon receipt of the control signals, applies pulse voltage Vej of pulse width T2 to the designated ink ejection electrode 55A and also applies a pulse train consisting of three pulses having a pulse width smaller than T2 (i.e., auxiliary voltage Vp) the non-designated ink ejection electrodes 55B. The ejection voltage Vej and auxiliary voltage Vp are the same in level. The application timing of the third pulse of the auxiliary voltage Vp is set such that this pulse is applied after the end of application of the ejection voltage Vej.

With the application of the ejection voltage Vej to the ink ejection electrode 55A designated to eject ink, color particles are moved by an electrostatic force and thus gather at the end of the ink ejection electrode 55A. As shown in FIG. 7, when the electrostatic force acting on the gathered color particles R surpasses the ink meniscus force, surface tension on the pigment type ink, viscosity force, etc., small particle masses 4 are caused to fly from the end of the ink ejection electrode 55A in synchronism to the application of the ejection electrode Vej. The particle masses 4 that are caused to fly are attached to the sheet 54, thus effecting the printing. The flying particle masses are mostly constituted by aggregated color particles although they are accompanied by a slight amount of liquid solvent. After the flying of particle masses, the corresponding amount of color particles are supplemented to the ink ejection opening 52 by the electric field set by the electrophoresis electrode 53. The above sequence of operations is repeated to form a desired image on the sheet 52.

Figure 8:
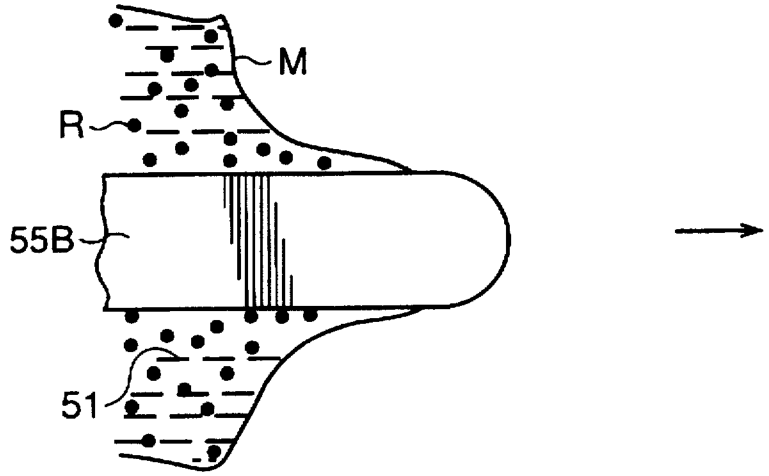
FIG. 8 is a view showing an ink meniscus formed at the end of an ink ejection electrode with the auxiliary voltage applied thereto.

At the non-designated ink ejection electrodes 55B, which are adjacent to the opposite sides of the designated ink ejection electrode 55A, and to which the auxiliary voltage Vp is applied, a sufficient concentration of color particles on the electrode end cannot be obtained because the pulse width of each pulse of the auxiliary voltage Vp is smaller than T2. As shown in FIG. 8, the ink meniscus M thus recedes towards the ink chamber 51 due to the surface tension acting on it. It is thus possible to effectively prevent ejection of color particles R from the end of the non-designated ink ejection electrodes 55B.

Figure 4:
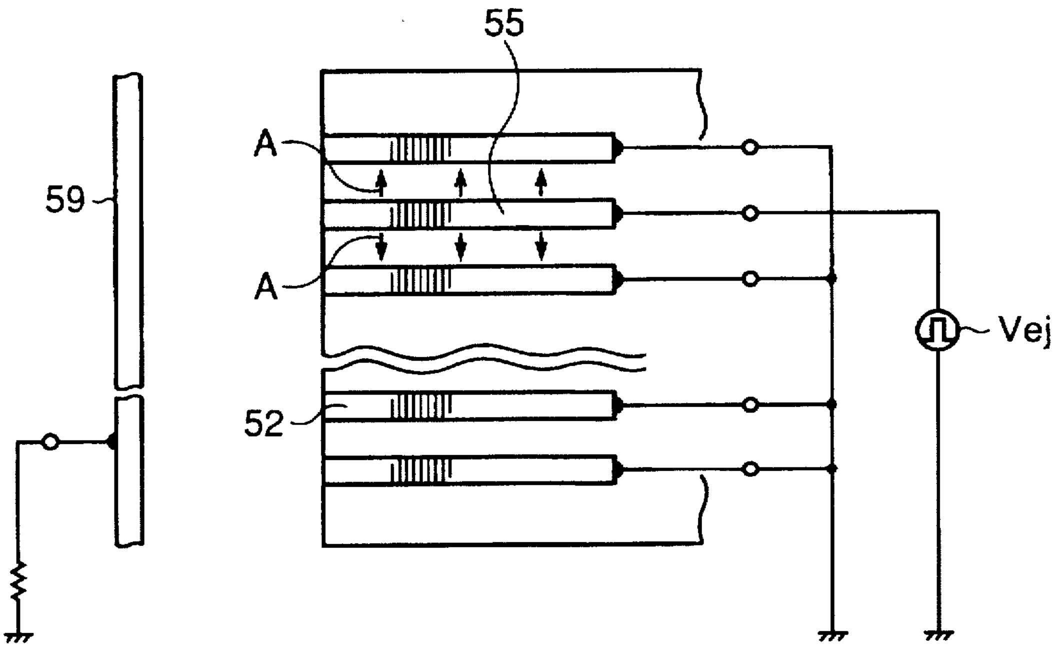
FIG. 4 PRIOR ART
FIG. 4 is a view for use in describing problems in the prior art ink jet head shown in FIGS. 1 to 3.

With the auxiliary voltage Vp set to be the same in level as the ejection voltage Vej, the potential difference between the non-designated and designated ink ejection electrodes 55B and 55A momentarily disappears to suppress the effect of the electric field as shown by the arrows A in FIG. 4. Consequently, the movement of color particles R from the designated ink ejection electrode 55A to the non-designated ink ejection electrodes 55B can be suppressed so that uniform color particle density in the ink ejection opening 52 and stable ejection of particle masses can be obtained.

As a further effect, an electric field which is generated between the non-designated ink ejection electrodes 55B with the auxiliary voltage Vp applied thereto and the opposite electrode 59, has an effect of improving the directivity of the electric field that is generated between the ink ejection electrode 55A for ejecting ink and the opposite electrode 59. It is thus possible to improve the accuracy of the ink ejection direction and the accuracy of printing.

The auxiliary voltage Vp may be longer in pulse width than T2 and lower in level than Vej, or it may be an AC voltage at a frequency with a constant bias so as to be ineffective to cause ink ejection.

As has been described in the foregoing, according to the invention, a voltage driving unit is used, which applies an ejection voltage to a designated ejection electrode to eject ink while applying an auxiliary voltage ineffective to cause ejection of color particles to non-designated ejection electrodes disposed adjacent to the two sides of the designated ejection electrode. It is thus possible to provide an ink jet type head, in which the potential difference between the designated and non-designated ejection electrodes is reduced to provide excellent effects in suppressing movement of color particles between them, that the color particle density in the ink ejection opening can be held uniform, and that it is possible to ensure stable concentration of particles on meniscus and ejection of particle masses.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An ink jet type head comprising:

a plurality of ink ejection electrodes in a form of parallel strips formed on a base;

an ink chamber for holding an ink of a pigment type on said base on which said ink ejection electrodes are provided;

an opposite electrode disposed on an imaginary extension of said ink ejection electrodes and facing said ink ejection electrodes with a sheet disposed between said opposite electrode and said ink ejection electrodes;

an ink ejection opening provided in said ink chamber and facing said opposite electrode;

an electrophoresis electrode disposed in said ink chamber and serving to cause electrophoresis of charged color particles contained in said ink towards said ink ejection opening;

a first ejection electrode included among said plurality of ink ejection electrodes;

second ejection electrodes included among said plurality of ink ejection electrodes and provided adjacent to two sides of said first ejection electrode; and a voltage driving unit for applying an ejection voltage for ink ejection to said first ejection electrode, said voltage driving unit applying said ejection voltage effective to cause the ink to be ejected to said first ejection electrode and applying an auxiliary voltage ineffective to cause the ink to be ejected to said second ejection electrodes.

2. An ink jet type head according to claim 1, in which said voltage driving unit is structured such that it applies to said second ejection electrode as said auxiliary voltage a pulse voltage being substantially the same in level as said ejection voltage and having a pulse width smaller than a pulse width of said ejection voltage.

3. An ink jet type head according to claim 1, in which said voltage driving unit is structured such that it receives as said auxiliary voltage a train of voltage pluses each being substantially the same in level as said ejection voltage and having a pulse width smaller than a pulse width of said ejection voltage.

4. An ink jet type head according to claim 3, in which said voltage driving unit is structured such that it starts application of said auxiliary voltage substantially simultaneously with application of said ejection voltage and ends the application of said auxiliary voltage after a lapse of a predetermined period of time from completion of the application of said ejection voltage.

* * * * *